(12) United States Patent
Klocke

(10) Patent No.: US 9,438,744 B2
(45) Date of Patent: Sep. 6, 2016

(54) METHOD AND DATA TRANSMISSION DEVICE FOR DATA TRANSMISSION WITHIN AN XDSL DATA TRANSMISSION SYSTEM CONNECTING AT LEAST TWO ETHERNET NETWORKS VIA XDSL LINKS

(71) Applicant: Phoenix Contact GmbH & Co. KG, Blomberg (DE)

(72) Inventor: Matthias Klocke, Hoexter (DE)

(73) Assignee: Phoenix Contact GmbH & Co. KG (DE)

( * ) Notice: Subject to any disclaimer, the term of this patent is extended or adjusted under 35 U.S.C. 154(b) by 260 days.

(21) Appl. No.: 14/053,666

(22) Filed: Oct. 15, 2013

(65) Prior Publication Data

US 2014/0105261 A1 Apr. 17, 2014

(30) Foreign Application Priority Data

Oct. 15, 2012 (DE) ........................ 10 2012 020 140

(51) Int. Cl.
*H04L 12/28* (2006.01)
*H04L 12/66* (2006.01)
*H04J 3/16* (2006.01)
*H04M 11/06* (2006.01)

(52) U.S. Cl.
CPC ........... *H04M 11/06* (2013.01); *H04M 11/062* (2013.01)

(58) Field of Classification Search
CPC ........................... H04M 11/06; H04M 11/062
USPC ................. 370/419–426, 463, 465–467, 469
See application file for complete search history.

(56) References Cited

U.S. PATENT DOCUMENTS

| | | | |
|---|---|---|---|
| 6,801,539 B1* | 10/2004 | Rives ...................... | H04J 3/047 370/430 |
| 7,075,935 B1 | 7/2006 | Humphrey | |
| 7,729,384 B1* | 6/2010 | Mantri .................. | H04L 1/0041 370/476 |
| 2003/0235201 A1* | 12/2003 | Kasper, II ............ | H04Q 3/0062 370/412 |
| 2006/0228113 A1* | 10/2006 | Cutillo .................. | H04J 3/1694 398/71 |
| 2007/0109974 A1* | 5/2007 | Cutillo ................ | H04L 12/2856 370/254 |
| 2008/0205298 A1 | 8/2008 | Polland et al. | |
| 2010/0214911 A1 | 8/2010 | Cooke et al. | |
| 2011/0099546 A1* | 4/2011 | Polland ................ | H04M 11/062 717/173 |

OTHER PUBLICATIONS

"Related EP Patent Application No. EP 13 00 4850 Search Report", Feb. 3, 2014, Publisher: EPO, Published in: EP.

Dr. Norbert Loechel, "Related German Patent Application No. 10 2012 020 140.0 Office Action", May 17, 2013, Publisher: Deutsches Patent- und Markenamt, Published in: DE.

* cited by examiner

*Primary Examiner* — Thai Hoang
(74) *Attorney, Agent, or Firm* — Kaplan Breyer Schwarz & Ottesen, LLP

(57) ABSTRACT

An xDSL data transmission system which comprises at least two xDSL data transmission devices that connect at least two Ethernet networks to the xDSL data transmission system. For transmitting payload data via an xDSL transmission link formed between two adjacent xDSL data transmission devices, a respective xDSL data transmission frame according to a first protocol stack is used, in which additionally an embedded operations channel is provided according to the first protocol stack. A second protocol stack different from the first protocol stack is provided according to which an access to the embedded operations channel within an xDSL data transmission device is executed, and management data for diagnostics and configuration of the xDSL data transmission system are added to, transferred within, and read from the embedded operations channel, independently of the payload data of the xDSL data transmission frame.

11 Claims, 6 Drawing Sheets

| SUB-SYSTEMS INTO WHICH TO BE BRANCHED (N) | SUB-SYSTEMS ALREADY BRANCHED INTO (X) | DESTINATION ADDRESS SUB-SYSTEM X | DESTINATION PORT FROM WHICH SUBSYSTEM X + 1 ORIGINATES | NUMBER OF FURTHER SUB-SYSTEMS (C) | FIRST PORT NUMBER OF SUB-SYSTEM X | SECOND PORT NUMBER OF SUB-SYSTEM X | DEVICES OF SUB-SYSTEM X CONNECTED VIA FIRST PORT NUMBER | DEVICES OF SUB-SYSTEM X CONNECTED VIA SECOND PORT NUMBER | IS SUB-SYSTEM A RING |
|---|---|---|---|---|---|---|---|---|---|
| | | ⎱——————— N + 1 TIMES ———————⎰ | | ⎱——————————— C TIMES ———————————⎰ | | | | | |

Fig. 5

| SUBSYSTEMS INTO WHICH TO BE BRANCHED (N) | SUBSYSTEMS ALREADY BRANCHED INTO (X) | SOURCE PORT FROM WHICH SUBSYSTEM X WAS ADDRESSED | DESTINATION PORT FROM WHICH SUBSYSTEM X + 1 ORIGINATES | SOURCE ADDRESS SUBSYSTEM X | DESTINATION ADDRESS SUBSYSTEM X |
|---|---|---|---|---|---|
| | | ⎱——————————— N + 1 TIMES ———————————⎰ | | | |

Fig. 4

METHOD AND DATA TRANSMISSION DEVICE FOR DATA TRANSMISSION WITHIN AN XDSL DATA TRANSMISSION SYSTEM CONNECTING AT LEAST TWO ETHERNET NETWORKS VIA XDSL LINKS

CROSS-REFERENCE TO RELATED APPLICATION(S)

German Patent Application No. DE 10 2012 020 140.0, with a filing date of Oct. 15, 2012, is incorporated herein by reference.

FIELD OF THE INVENTION

The invention relates to methods and data transmission devices for data transmission within an xDSL data transmission system which interconnects at least two Ethernet networks via xDSL connection links, and to a corresponding data transmission system.

SUMMARY OF THE INVENTION

The invention is based on a data transmission system used for connecting a plurality of Ethernet networks via xDSL connection links, in particular via SHDSL dedicated line connections. Such data transmission systems may be configured as a point-to-point configuration such as illustrated in accompanying FIG. 6, as a linear configuration such as illustrated in accompanying FIG. 7, as a ring configuration such as illustrated in accompanying FIG. 8, or as a combination of a plurality of such configurations such as illustrated in accompanying FIG. 9, wherein, generally, a linear or ring configuration is formed of a plurality of point-to-point connections.

In the context of DSL (Digital Subscriber Line) transmission technology, a variety of access techniques have been developed by today, such as Asymmetric Digital Subscriber Line (ADSL), Symmetric Digital Subscriber Line (SDSL), Single pair High-speed Digital Subscriber Line (SHDSL), or Global standard for Single pair High-speed Digital Subscriber Line (G.SHDSL), Very high-speed Digital Subscriber Line (VDSL), among others. All of these techniques of DSL transmission technology, which are adapted to different user requirements, are grouped under the term "xDSL".

The DSL transmission technology being a basis for all of these techniques is a kind of broadband access technology and uses twisted pair cables as connection lines for each xDSL transmission link and thus as the transmission medium between at least two xDSL data transmission devices. In the simplest case, the first one of these two xDSL data transmission devices is the beginning of an xDSL transmission system, e.g. on the side of a central or local exchange, and the second one of these two xDSL data transmission devices is the end of the xDSL transmission system, e.g. on the side of a subscriber line. Further, individual xDSL transmission links may be interconnected using additional xDSL data transmission devices, so that the total length of an xDSL data transmission system may be increased by concatenating individual xDSL transmission links within the xDSL data transmission system.

Also, other xDSL data transmission devices may be connected between the xDSL transmission devices which form the beginning of an xDSL transmission system and the end of the xDSL transmission system. For example, in an SHDSL data transmission system according to the standard, eight further SHDSL data transmission devices may be connected between these SHDSL transmission devices which form the beginning of an xDSL transmission system and the end of the xDSL transmission system.

Moreover, all of these techniques have in common that according to the relevant xDSL standard an embedded operations channel (EOC) is provided in a manner to have assigned a narrow bandwidth in the overhead of each xDSL data transmission frame to form a virtual channel.

Further, xDSL data transmission devices such as illustrated in accompanying FIG. 1 based on an SHDSL data transmission system, between which a respective xDSL transmission link is defined and which form such an xDSL data transmission system and which interconnect at least two Ethernet networks via xDSL connection links and through which, where appropriate, such Ethernet networks may be connected to such a data transmission system, may be divided into active and passive xDSL data transmission devices.

In the context of the invention, such active xDSL data transmission devices are defined as those xDSL data transmission devices, which can be directly addressed from the Ethernet network which they connect to the data transmission system, and therefore themself being participants of this Ethernet network. Such active xDSL data transmission devices usually have a web page or a web-based management, through which they may be configured and diagnosed, or are configured as a repeater which provides diagnostics accessible from the Ethernet network. Passive xDSL data transmission devices in the context of the invention, on the other hand, are defined as those xDSL data transmission devices which cannot be addressed from an Ethernet network and which exclusively deal with data transfer. Such passive xDSL data transmission devices may for example constitute simple media converters, simple dedicated line modems, or simple repeaters. Such passive xDSL data transmission devices may usually only be configured either via a DIP switch or via a locally available interface using a software.

Advantages of such passive xDSL data transmission devices when compared to such active xDSL transmission devices can be seen in the fact that few or even no adjustments need to be made upon startup, whereas the startup and configuration of active xDSL data transmission devices is often more complex or requires special knowledge. In addition, passive xDSL data transmission devices are usually cheaper than active ones, due to lower hardware requirements.

Drawbacks of passive xDSL data transmission devices when compared to active xDSL data transmission devices can be seen in the fact that diagnostics and configuration, at least completely, is only possible locally at the device, whereas active xDSL data transmission devices offer the possibility to allow for configuration and diagnostics from any point of the Ethernet network which they connect to the xDSL data transmission system. Since such xDSL data transmission systems often cover large geographical distances and may comprise many xDSL transmission devices, a considerable time advantage results, for example when debugging.

Furthermore, a requirement on an xDSL data transmission system interconnecting a plurality of Ethernet networks is a high availability. This is often ensured by implementing a redundant configuration which ensures the forwarding of data even if a single xDSL link fails. A redundant configuration often employed is a ring configuration (FIG. 8). However, in this case, one xDSL transmission link of the ring is disabled for data transmission. In case of failure of another xDSL transmission link, the disabled xDSL transmission link is re-enabled, so that all xDSL data transmission devices remain accessible.

The control about which xDSL transmission link in such a system has to be disabled for data transmission, is currently performed by standard protocols, such as RSTP (Rapid Spanning Tree Protocol), or MRP (Media Redundancy Protocol) in Ethernet. There are also a number of proprietary protocols performing this task. Currently, however, passive xDSL data transmission devices are not able to support these protocols since these protocols require that the data transmission devices have access to the data to be transferred.

Furthermore, diagnostics of individual xDSL transmission links in xDSL transmission devices have been possible over the EOC channel hitherto. However, since this virtual channel only extends along a single point-to-point connection, the diagnostics thus possible currently only relates to parameters of certain xDSL transmission links, and diagnostics or even a configuration of any single xDSL data transmission device and therefore in particular more detailed diagnostics which permit to retrieve device specific data that are not provided in a standard or recommendation, is currently not possible through this virtual channel.

Therefore, an object of the invention is to provide a method and xDSL data transmission devices for an xDSL data transmission system, in particular for an SHDSL data transmission system for connecting individual Ethernet networks, which allow for a configuration of as few as possible active xDSL data transmission devices, especially in order to save hardware costs and time during startup, and which enable diagnostics of the xDSL data transmission system, or preferably even diagnostics and possibly configuration of any single xDSL data transmission device from substantially any point of the xDSL data transmission system, at least if at least one active xDSL data transmission device is provided within the xDSL data transmission system. If only passive xDSL data transmission devices are provided in the xDSL data transmission system, it must be possible appropriately to reach all xDSL data transmission devices of the xDSL data transmission system from one locally connected passive xDSL data transmission device. The diagnostics should preferably show both the active and passive xDSL data transmission devices of the xDSL data transmission system in their physical arrangement.

Solutions according to the invention are provided by the subject matter of the pending independent claims, and preferred embodiments and modifications are set forth in the dependent claims.

Accordingly, the invention provides a data transmission method, for transmitting data within an xDSL data transmission system which comprises at least two xDSL data transmission devices connecting at least two Ethernet networks to the xDSL data transmission system, wherein a respective xDSL data transmission frame according to a first protocol stack is used for transmitting payload data via an xDSL transmission link provided between two adjacent xDSL data transmission devices, in which additionally an embedded operations channel is provided according to the first protocol stack. The method is characterized in that a second protocol stack different from the first protocol stack is provided, according to which an access to the embedded operations channel within an xDSL data transmission device is executed independently of any access to the payload data, and then management data for diagnostics and configuration of the xDSL data transmission system are added to the embedded operations channel independently of the payload data of the xDSL data transmission frame, are transferred therein, and read out therefrom.

This makes it possible to exchange management data in parallel with the payload data between both active and passive xDSL data transmission devices on the already embedded operations channel of an xDSL data transmission frame, so that data may be detected for diagnostics of xDSL data transmission devices participating in the xDSL data transmission system, and on the basis thereof these xDSL data transmission devices may present an image of the physical configuration of the xDSL data transmission system using the information obtained by the management data. Due to the respective independent execution of access to the embedded operations channel, it is also possible in principle, to directly address a plurality of other xDSL transmission devices from each of such xDSL data transmission devices, and not only to perform a diagnostics of individual xDSL transmission links based on a single point-to-point connection according to the respective xDSL standard.

The data transmission method herein is preferably a method for data transmission within an SHDSL data transmission system, in particular because such system provides the same data transmission rate in both upstream and downstream.

For this purpose, the invention preferably proposes an xDSL data transmission device for data transmission within an xDSL data transmission system, wherein for transmitting payload data via an xDSL transmission link formed between two adjacent xDSL data transmission devices, a respective xDSL data transmission frame according to a first protocol stack is used, wherein the xDSL data transmission system comprises at least two xDSL data transmission devices that connect at least two Ethernet networks to the xDSL data transmission system, wherein the xDSL data transmission device preferably is an SHDSL data transmission device for data transmission within an SHDSL data transmission system. Such an xDSL data transmission device according to the invention comprises, in addition to at least one Ethernet interface for connecting an Ethernet network to the xDSL data transmission system, at least one transceiver unit connected to an xDSL transmission link and communicating with the at least one Ethernet interface, which transceiver unit is adapted for processing an xDSL data transmission frame according to the first protocol stack, which xDSL data transmission frame includes, besides a region for the payload data, an embedded operations channel according to the first protocol stack, and is adapted, based on this processing, for forwarding payload data within the xDSL data transmission frame according to the first protocol stack to be transmitted to the xDSL transmission link, and/or payload data received via the xDSL transmission link within the xDSL data transmission frame in accordance with the first protocol stack. Further, such an xDSL data transmission device has a processor unit connected to the at least one transceiver unit and communicating with the at least one Ethernet interface, wherein the processor unit has associated therewith a second protocol stack different from the first protocol stack, according to which the processor unit is instructed to execute an access to the embedded operations channel within the xDSL data transmission device independently of the processing of the xDSL data transmission frame according to the first protocol stack, and based on the execution according to the second protocol stack to add management data for diagnostics and configuration of at least the xDSL data transmission system to the embedded operations channel independently of the payload data of the xDSL data transmission frame, to transfer such management data therein, and to read them out therefrom.

Thus, the embedded operations channel (EOC) is connected to the processor, so that in contrast to xDSL standards the operations channel terminates in the respective processor of each xDSL data transmission device and only provides the purely physical transfer capability, so that the intended functionality of the embedded operations channel (EOC) according to xDSL standard is disabled, and as a consequence management data of the embedded operations channel are exchanged directly and independently of the payload data of the xDSL data transmission frame with the respective processor of an xDSL data transmission device, and are processed, added and forwarded by this processor.

Therefore, by using the invention, involved xDSL data transmission devices may provide comprehensive diagnostics of the entire xDSL transmission system and not just of a single xDSL data transmission device. Also, for example, diagnostics relating to the number of other participants of an xDSL transmission system connected to a respective connection port of an xDSL data transmission device may be made available across the entire xDSL transmission system. Consequently, a restriction of the number of participants of such a system as it may be specified by the relevant standard will be eliminated, such as for example the number of participants which is limited to up to a maximum of 8 participants according to the SHDSL standard in a system for the diagnostics predefined by the standard.

The data transmission method according to the invention is preferably characterized by the fact that, based on the execution according to the second protocol stack and in response to management data read from the embedded operations channel for operating a redundant ring structure, access of an xDSL data transmission device to an xDSL transmission link connected with this xDSL data transmission device is disabled with respect to payload data of the xDSL data transmission frame, while the access to the xDSL transmission link with respect to management data of the embedded operations channel continues to be maintained.

Preferably for this purpose, the xDSL data transmission device, in particular the SHDSL data transmission device, comprises an Ethernet switch physically or logically connected between the at least one Ethernet interface, the at least one transceiver unit and the processor unit within the path for forwarding the payload data to be transmitted to the xDSL transmission link within the xDSL data transmission frame according to the first protocol stack, and/or the payload data received from the xDSL transmission link within the xDSL data transmission frame according to the first protocol stack, wherein the processor unit is adapted to block the Ethernet switch for the path for forwarding according to the first protocol stack for the at least one transceiver unit based on the execution according to the second protocol stack and in response to management data read from the embedded operations channel for operating a redundant ring structure, while the access of the processor unit to the embedded operations channel within the xDSL data transmission device continues to be fully executable by bypassing the Ethernet switch.

Suitably, the Ethernet switch is therefore completely disabled with respect to the xDSL link to be blocked for payload data, and does not permit access to payload data of this link any more, not even to management data. The processor unit, by contrast, continues to be able to fully access to the data management of the embedded operations channel, in particular via a second interface, e.g. a microprocessor interface which is directly connected to an xDSL chip on which appropriately the at least one transceiver unit is arranged. In other words, the management data and payload data use different interfaces for forwarding within each xDSL data transmission device according to the invention.

This allows to implement a ring redundancy, and due to the management data transferable on the embedded operations channel according to the invention, this may also be accomplished taking into account the respective quality of the xDSL transmission links, so that, for example, the worst xDSL transmission link will always be used as a backup route in a ring.

Furthermore, for automatically detecting the configuration of the xDSL transmission system, it is suitably suggested that based on the execution according to the second protocol stack, predefined services for detecting the physical configuration of the xDSL data transmission system are assigned to the management data, and that identifiers for identifying the location within the physical configuration of the xDSL data transmission system of the xDSL data transmission device which adds the respective management data are added.

Preferably for this purpose, the processor unit of the xDSL data transmission device is adapted, based on the execution according to the second protocol stack, to assign predefined services for detecting the physical configuration of the xDSL data transmission system to the management data to be added, and to add an identifier for identifying the location within the physical configuration of the xDSL data transmission system of the processor unit as that processor unit which adds these management data.

Therefore, based on such identifiers for identifying the location, detection of the other xDSL data transmission devices within the xDSL data transmission system is made possible in a simple way, in particular by having incremented and/or decremented the identifiers by the other xDSL data transmission devices, as well as a detection of whether these xDSL data transmission devices are connected in a point-to-point configuration, a linear configuration, or in a ring.

Preferably, moreover, also by using the detected physical configuration of the xDSL data transmission system and based on the execution according to the second protocol stack, the data transmission method of the invention assigns predefined services to the management data, and adds identifiers for identifying the location within the physical configuration of the xDSL data transmission system of an xDSL data transmission device intended for reading out the respective management data.

Therefore, in particular if the processor unit of the xDSL data transmission device is adapted, based on the execution according to the second protocol stack, to assign predefined services to the management data to be added using the physical configuration of the xDSL data transmission system detected, and to add at least one identifier for identifying the location within the physical configuration of the xDSL data transmission system of one or more xDSL data transmission device(s) intended for reading out the added management data, the invention thus permits to address xDSL data transmission devices solely based on their physical location, for example in order to perform specific diagnostics, or to make adjustments, in particular configurations, in a specific xDSL data transmission device.

For example, it is now possible, based on a 1-byte identifier, to additionally address up to 255 xDSL data transmission devices.

A particularly preferred embodiment of the invention therefore suggests, in addition to the at least one identifier for identifying the location within the physical configuration of the xDSL data transmission system of an xDSL data transmission device intended for reading out the respective management data, to additionally add an identifier for identifying the location within the physical configuration of the xDSL data transmission system of the processor unit as that processor unit which adds these management data.

In this way remote services may be provided easily, in order to exchange management data between essentially any xDSL transmission devices, and to permit configuration and parameterization of essentially any xDSL transmission device from any remote xDSL data transmission device.

Thus, for this purpose it is furthermore preferably suggested to increment an identifier which had been added to the management data for identifying the location of a processor unit of another xDSL data transmission device of the xDSL data transmission system which added these management data, by each subsequently forwarding xDSL data transmission device, and to reinsert the incremented identifier to the management data for being further forwarded, and/or to decrement an identifier which had been added to the management data for identifying the location within the physical configuration of the xDSL data transmission system of another xDSL data transmission device intended for reading out the respective management data, by xDSL data transmission devices forwarding these management data, and to reinsert the decremented identifier to the management data for being further forwarded. This permits to efficiently forward services, in particular also superimposed services, to any remote xDSL data transmission device, and to return acknowledgments to specific xDSL data transmission device, likewise to any remote location.

Accordingly, the invention consequently also provides an xDSL data transmission system, in particular an SHDSL data transmission system, that comprises a plurality of xDSL data transmission devices according to the invention, which connect at least two Ethernet networks to the xDSL data transmission system, and which is therefore adapted to perform the data transmission method according to the invention.

Another advantage is that in the context of the invention the xDSL data transmission system may be configured as a point-to-point configuration, a linear configuration, or as a ring configuration, and that a ring configuration may be automatically detected, even if only passive xDSL data transmission devices are used. In a ring configuration it is moreover possible to automatically determine an xDSL transmission link to be disabled for the transfer of payload data when considering current diagnostics of all xDSL transmission links. Therefore, advantageously, switching to an alternative xDSL transmission link may already be accomplished before a critical xDSL transmission link fails, and suitably this decision can even be made by passive xDSL data transmission devices.

BRIEF DESCRIPTION OF THE DRAWINGS

Additional features and advantages will become apparent from the following description of preferred embodiments with reference to the drawings. In the drawings:

FIG. 4 shows an exemplary configuration of a service according to the invention, that may be assigned to the management data;

FIG. 5 shows another exemplary configuration of a service according to the invention, that may be assigned to the management data;

DETAILED DESCRIPTION

Figure 1:
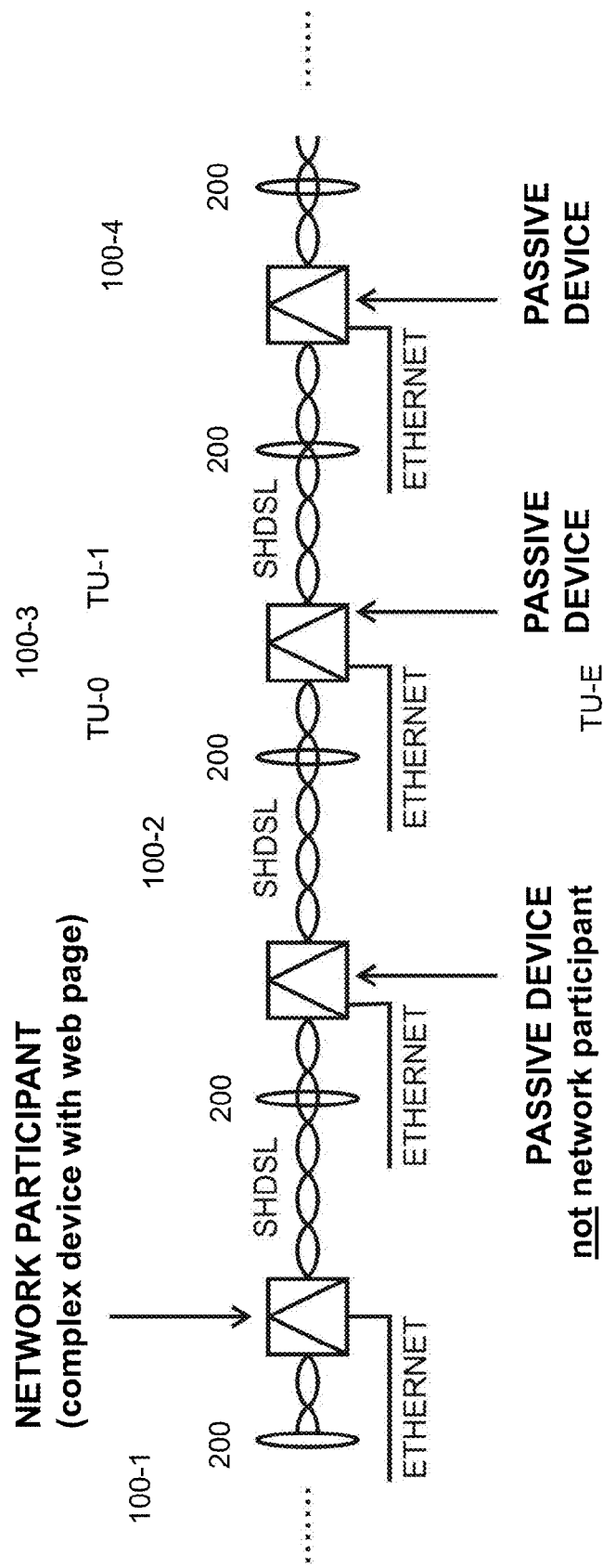
FIG. 1 shows an exemplary combination of active and passive xDSL data transmission devices in an exemplary SHDSL transmission system according to the invention.
Figure 2:
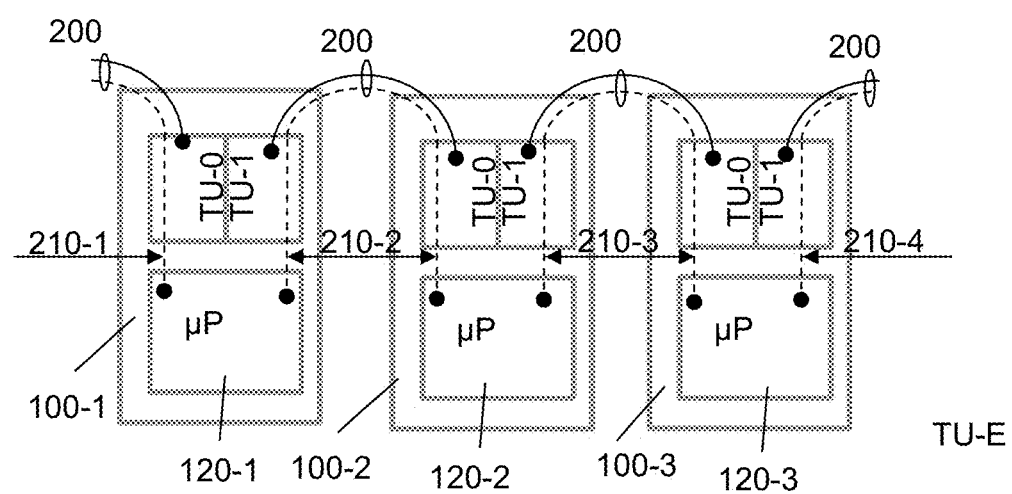
FIG. 2 is a schematic diagram of linearly connected xDSL data transmission devices, in which in an exemplary SHDSL transmission system the embedded operations channel (EOC) according to the invention is connected to the processor, so that the operations channel terminates in the processor, in contrast to xDSL standards.
Figure 3:
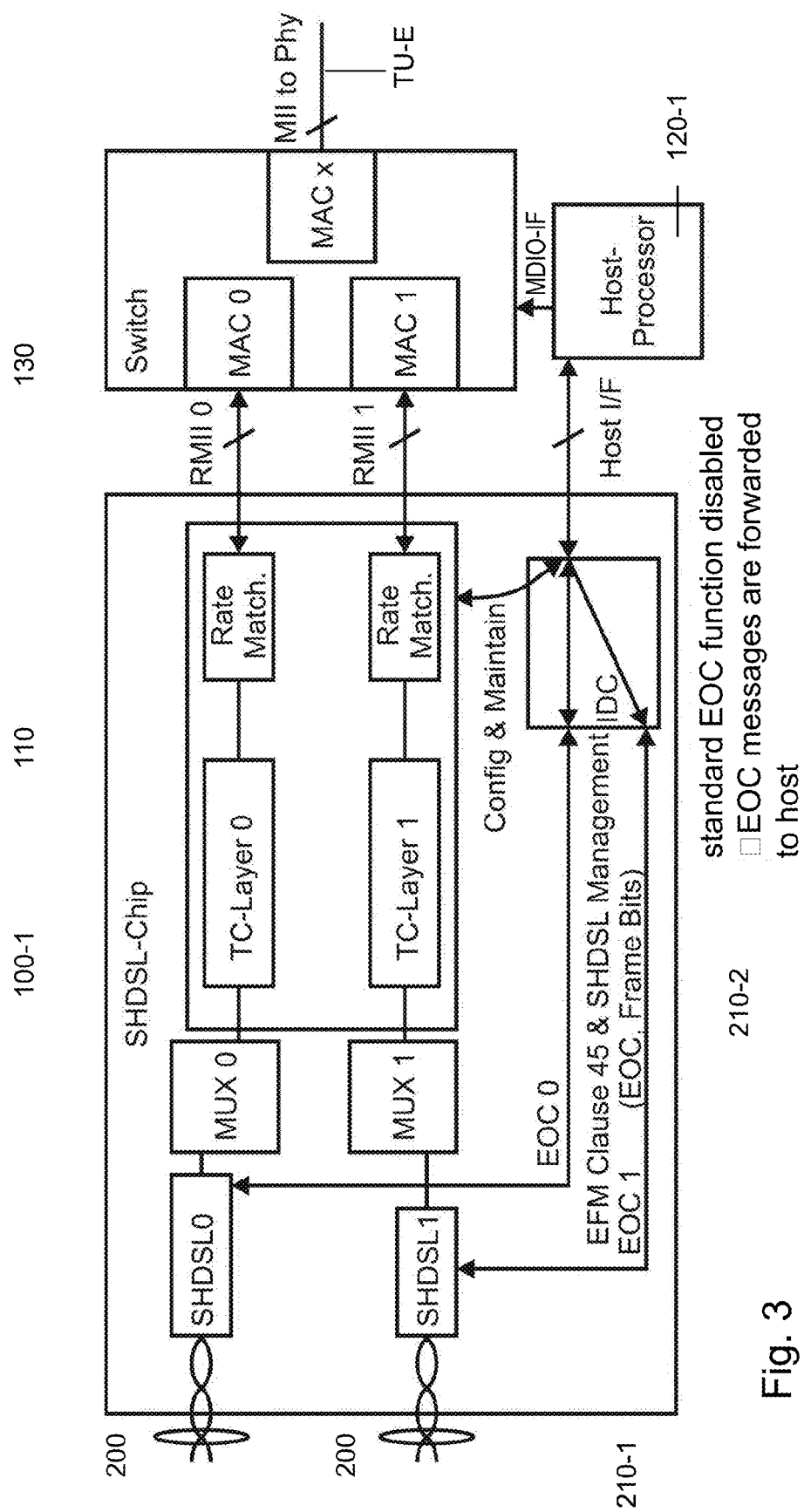
FIG. 3 is a schematic diagram of a configuration of an internal interface within an SHDSL data transmission device as an example of an xDSL data transmission device according to the invention.
Figure 6:
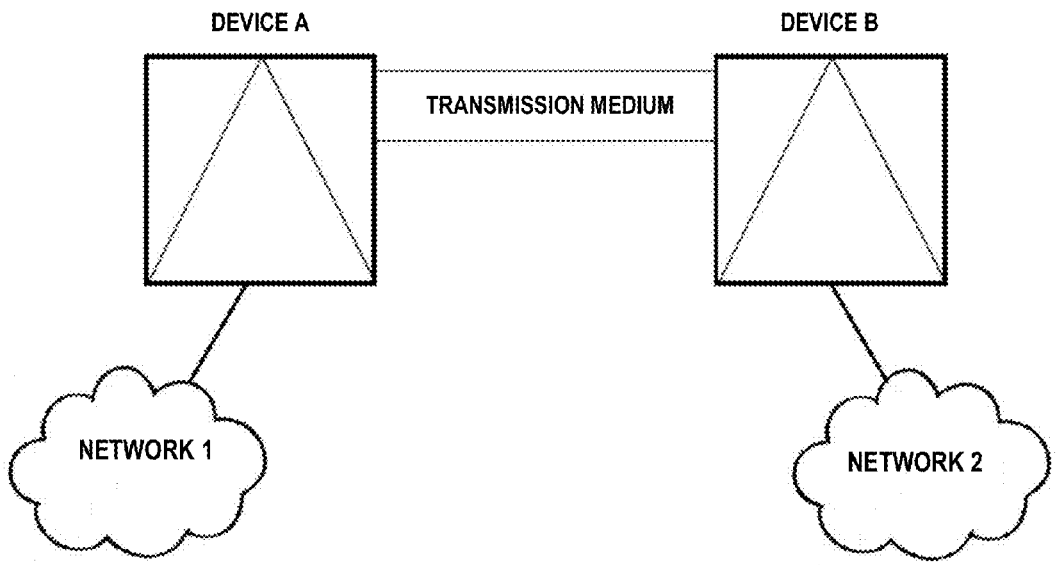
FIG. 6 shows an example of a point-to-point configuration of an xDSL data transmission system according to the invention.
Figure 7:
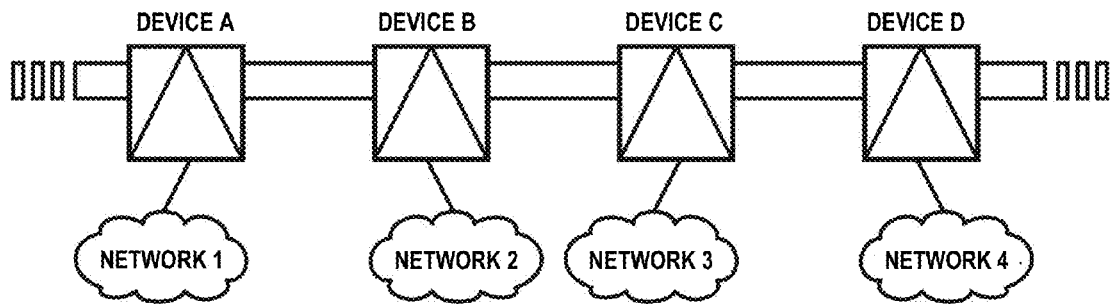
FIG. 7 shows an example of a linear configuration of an xDSL data transmission system according to the invention.
Figure 8:
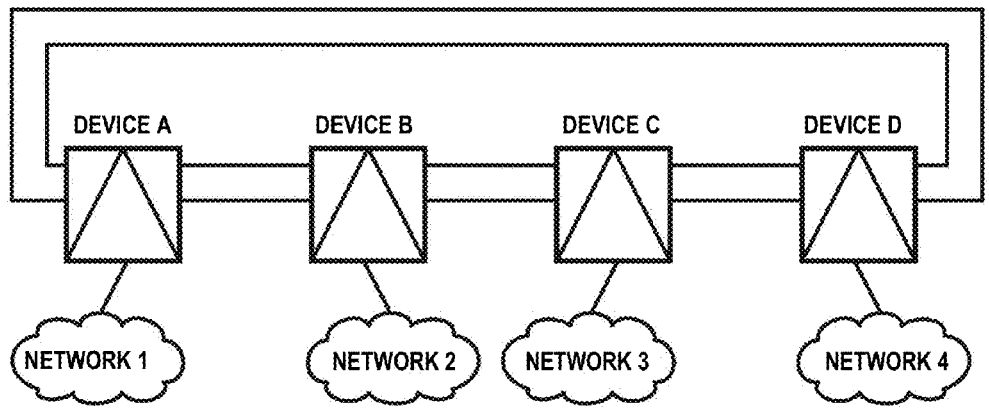
FIG. 8 shows an example of a ring configuration of an xDSL data transmission system according to the invention.

The invention will now be described by way of preferred embodiments, based on an exemplary SHDSL data transmission technology and with reference to the accompanying drawings, first referring to FIGS. 1 to 3, wherein FIG. 1 shows an exemplary combination of active and passive xDSL data transmission devices in an exemplary SHDSL transmission system according to the invention, FIG. 2 shows a schematic diagram of linearly connected xDSL data transmission devices, wherein in an exemplary SHDSL transmission system the embedded operations channel (EOC) according to the invention is connected to the processor, so that the operations channel terminates in each individual processor of each xDSL data transmission device of the xDSL data transmission system, in contrast to xDSL standards, and FIG. 3 shows a schematic diagram of a configuration of an internal interface within an xDSL data transmission device according to the invention, in an exemplary SHDSL data transmission device.

Specifically, four xDSL data transmission devices 100-1, 100-2, 100-3, and 100-4 are illustrated in FIG. 1 in very simplified manner in an xDSL data transmission system of a linear configuration. Since in the preferred example the xDSL data transmission system is an SHDSL transmission system, as mentioned above, xDSL data transmission devices 100-1, 100-2, 100-3, and 100-4 are configured as SHDSL data transmission devices. SHDSL data transmission devices 100 1, 100-2, 100-3, and 100-4 are interconnected via twisted pair wires as the connecting lines, which define respective SHDSL transmission links between the SHDSL data transmission devices 100-1, 100-2, 100-3, and 100-4, over which, thus, SHDSL signals may be transferred in a standard-compliant SHDSL data transmission frame 200. Between xDSL data transmission device 100-1 and a further SHDSL data transmission device, not shown, and between SHDSL data transmission device 100-4 and a further SHDSL data transmission device, not shown, twisted pair wires are also shown as the connecting lines over which accordingly such SHDSL signals may be transmitted in a standard-compliant SHDSL data transmission frame 200.

For receiving and/or transmitting an SHDSL signal, each SHDSL data transmission device 100-1, 100-2, 100-3, and 100-4 has one transceiver unit connected to each SHDSL transmission link, and therefore has at least one transceiver unit. Therefore, according to the example of FIG. 1, every SHDSL data transmission device has two transceiver units, which are designated TU-0 and TU-1 at the SHDSL data transmission device 100-3, by way of example, and wherein TU stands for Transceiver Unit.

Generally, according to the invention, the xDSL data transmission system comprises at least two xDSL data transmission devices, which connect at least two Ethernet networks to the xDSL data transmission system which is therefore at least configured in a point-to-point configuration. For this purpose, each xDSL data transmission device which connects an Ethernet network further has at least one Ethernet interface, one of which is designated TU-E in FIG. 1 at SHDSL data transmission device 100-3, by way of example.

As can also be seen from FIG. 1, in the context of the invention the SHDSL data transmission devices illustrated therein may constitute active data transmission devices, 100-1, or passive data transmission devices, 100-2, 100-3, and 100-4, according to the above introductory description.

As will be apparent from the schematic diagram of FIG. 2, for example, in which the Ethernet interface is not illustrated for the sake of clarity, an embedded operations channel (EOC) is provided in each SHDSL transmission frame 200 in compliance to the standard, which is shown by dashed lines in FIG. 2 and designated by reference numerals 210-1, 210-2, 210-3, and 210-4.

Each transceiver unit TU-0 and TU-1 is further adapted for processing an xDSL data transmission frame 200 according to a first protocol stack, not shown in the figures, and based on this processing for forwarding payload data to be transmitted to the xDSL transmission link in xDSL data transmission frame 200 according to the first protocol stack, and/or payload data received via the xDSL transmission link in xDSL data transmission frame 200 according to the first protocol stack. For this purpose, also according to the first protocol stack, an embedded operations channel 210-1, 210-2, 210-3, and 210-4 is provided in SHDSL data transmission frame 200 in addition to an area for payload data.

Also, according to FIG. 2, each SHDSL data transmission device 100-1, 100-2, and 100-3 configured according to the invention has a processor unit 120-1, 120-2, and 120-3, which has associated therewith a second protocol stack different from the first protocol stack, not shown in the figures, according to which the processor unit 120-1, 120-2, and 120-3 is instructed to execute an access to the embedded operations channel 210-1 and 210-2, 210-2 and 210-3, or 210-3 and 210-4 within the SHDSL data transmission device independently of the processing of the xDSL data transmission frame according to the first protocol stack, and to add management data for diagnostics and configuration of the SHDSL data transmission system into the embedded operations channel independently of the payload data of the SHDSL data transmission frame, and to transfer these management data within the embedded operations channel and read them out therefrom.

As can be seen in FIG. 3 from the example of SHDSL data transmission device 100-1, the at least one Ethernet interface TU-E, the at least one transceiver unit which is combined on an SHDSL chip 110 in FIG. 3, and the processor unit 120 are in communication with each other.

The embedded operations channel is thus connected to the respective processor unit 120-1, 120-2, or 120-3 in such a manner that due to the connection caused thereby a physical channel terminates in processor unit 120-1, 120-2, or 120-3 and permits to use an individual protocol in accordance with a second protocol stack for transferring management data in parallel to and independently of the payload data, and which is supported by both active and passive SHDSL data transmission devices.

In other words, management data processed according to this protocol stack different from the first protocol stack are transferred on the channel integrated in xDSL data transmission systems (Embedded Operations Channel; EOC channel) which for example in SHDSL data transmission systems has actually only been provided for predefined diagnostics of a point-to-point connection, which may optionally have up to 6 repeaters in compliance with the standard.

As can be seen from FIG. 3, according to the invention the actual function of this channel is therefore disabled, resulting in that all management data that is exchanged through this channel, are directly forwarded to processor unit 120-1, in particular a host processor of the xDSL data transmission device. This channel therefore permits, for example, to transfer data from host processor 120-1 of SHDSL data transmission device 100-1 to the host processor of another SHDSL data transmission device, without any access of processor 120-1 to the interface used for forwarding payload data within the SHDSL data transmission device. Specifically, as shown in FIG. 3, the management data of the EOC channel are transferred via processor interface "Host I/F" of the SHDSL chips 110, while chip 110 provides and/or is provided with SHDSL payload data to be forwarded via an MII interface "RMII 0", or "RMII 1".

Since in the context of the invention each xDSL data transmission device, whether passive or active, includes a "Host I/F" processor interface, the EOC channel may thus be used for the transfer of management data based on the second protocol stack different from the first protocol stack.

In order to operate a redundant ring using the second protocol stack, the xDSL data transmission devices in the context of the present invention are able to block such an interface used for transferring payload data, while the management data to be transferred on the EOC channel continue to be transferred via a separate interface used for this purpose.

According to the invention, the xDSL data transmission devices such as SHDSL data transmission device 100-1 of FIG. 3 advantageously comprise, for this purpose, at least one Ethernet switch 130 physically or logically connected between the Ethernet interface TU-E, the at least one transceiver unit 110 and the processor unit 120-1 within the path for forwarding the payload data to be transmitted to xDSL transmission link in the xDSL data transmission frame according to the first protocol stack and/or the payload data received via the xDSL transmission link within the xDSL data transmission frame according to the first protocol stack, wherein the processor unit 120-1 is adapted to block the Ethernet switch 130 for the path for transferring payload data by the transceiver unit 110 to or from a xDSL transmission link connected therewith, i.e. the xDSL transmission link for the transceiver unit 110 with respect to payload data of the xDSL data transmission frame 200, based on the execution according to the second protocol stack and in response to management data read from the embedded operations channel for operating a redundant ring structure. Therefore, the Ethernet switch 130 in FIG. 3 will then ignore all data it receives via RMII 0 or via RMII 1, while an access of the processor unit 120-1 to this xDSL transmission link with respect to management data of the embedded operations channel continues to be possible without restrictions by bypassing the Ethernet switch.

According to the configuration of FIG. 3, the SHDSL data transmission devices according to the invention thus suitably comprise an Ethernet switch 130, which in case of two SHDSL transmission links connected to such an SHDSL data transmission device has at least three ports to connect each of the two SHDSL transmission links and at least one Ethernet network. According to FIG. 3, the host processor 120-1 which is connected to this switch 130 via an "MDIO-IF" (Management Data Input/Output InterFace) interface, can just turn off, via this "MDIO-IF" interface used to manage switch 130, the port connected to the payload data interface to be disabled, e.g. the "MAC 0" port, in case data with respect to the payload data interface "RMII 0" are to be ignored. Via processor interface "Host I/F" of SHDSL chip 110, however, the processor unit 120-1 continues to have full access to the SHDSL transmission link blocked for the payload data, i.e. access to the management data of the embedded operations channel. Thus, management data transferred on the EOC channel continue to be provided at the processor interface "Host I/F" of SHDSL chip 110.

Preferably, processor unit 120-1 is further configured to assign to the management data that are to be added predefined services for detecting the physical configuration of the xDSL data transmission system, based on the execution according to the second protocol stack, and to add an identifier for identifying the location within the physical configuration of the xDSL data transmission system of processor unit 120-1 as that processor unit which adds the management data.

In addition, processor unit 120-1 is preferably further configured to not only assign, based on the execution according to the second protocol stack, to the management data that are to be added predefined services using the detected physical configuration of the xDSL data transmission system, but additionally to add at least one identifier for identifying the location within the physical configuration of the xDSL data transmission system of one or more xDSL data transmission device(s) intended for reading out the management data added.

Therefore, once the physical configuration of the xDSL data transmission system has been detected, processor unit 120-1 preferably inserts, in addition to the at least one identifier for identifying the location within the physical configuration of the xDSL data transmission system of another xDSL data transmission device intended for reading out the management data added, an identifier for identifying the location within the physical configuration of the xDSL data transmission system of the processor unit as the inserting processor unit, as will be apparent from the following description.

For forwarding management data from one xDSL data transmission device that has received these management data to another xDSL data transmission device, based on the execution according to the second protocol stack, processor unit 120-1 is advantageously adapted to increment an identifier which had been added to the management data for identifying the location of a processor unit of another xDSL data transmission device of the xDSL data transmission system, which added this identifier, and to reinsert the incremented identifier into the management data for being further forwarded, and/or to decrement an identifier which had been added to the management data for identifying the location within the physical configuration of the xDSL data transmission system of another xDSL data transmission device intended for reading out the respective management data, and to reinsert the decremented identifier to the management data for being further forwarded.

This most preferably allows for a further advantageous application of the invention in an effective way, since by using specific services the physical configuration of the xDSL data transmission system may then be automatically detected, and by using this configuration it is then possible to address the xDSL data transmission devices adapted according to the invention on the basis of their physical order. These services for detecting the configuration preferably include services such as "change of a link detected" (LINK_CHANGE_DETECTED), "enabled link" (LINK_ALIVE), "increment devices" (INC_DEVICES), and "set number of devices in the system" (SET_DEVICES), and "advertise diagnostics of a link" (ADVERTISE_LINK_DIAGNOSTICS), for example. Even when the configuration has been detected, each of these services advantageously comprises an identifier for identifying the location within the physical configuration of the xDSL data transmission system of the processor unit adding these management data, wherein once the configuration has been detected the identifier may include a unique number of the sender, such as a MAC address or serial number, inter alia.

Advantageously, therefore, in the context of the invention all xDSL data transmission devices of the xDSL data transmission system are capable to detect a change in a link, i.e. the establishment of a data link and the termination of a data link.

This may be accomplished in various ways. In Ethernet, the phy (FIG. 3) directly indicates the state of a link. At the xDSL interfaces (designated SHDSL0 and SHDSL1 in FIG. 3), the host processor may usually query the state of the transmission link from the xDSL chip, via the Host I/F processor interface of the xDSL chip.

Alternatively, the link state may also be determined using the above-mentioned LINK_ALIVE service associated with the management data. In this case, the service is advantageously transmitted cyclically by an xDSL data transmission device, with a configurable time interval, and is directly acknowledged by the neighboring device. In case of the acknowledgment preferably provided, the addressed xDSL data transmission device passes for example its unique device number, such as the MAC address. If the acknowledgment from the link partner is missing for a certain number of repetitions, there is no link existing.

Optionally, the service also includes a parameter for time measurement. A count may be entered as the transmission time when transmitting the service. This count is simply copied into the acknowledgment of the service by the xDSL data transmission device that receiving this service. By comparison with the now increased count, the sender may thus obtain an information about the transfer time.

Thus, the service LINK_ALIVE is preferably initiated at least once following the establishment of a link by each xDSL data transmission device involved in the link establishment, in order to determine whether a newly connected xDSL data transmission device supports protocol execution according to the second protocol stack. If an acknowledgment is missing or if the acknowledgment does not correspond to the expected form, it can be assumed that the neighboring device does not support the second protocol stack.

Since the further preferred processing depends on the configuration of the xDSL data transmission system, it will be explained below by way of examples:

If for example a link was established between two linear configurations to combine these linear configurations into a single linear configuration, first both xDSL data transmission devices involved in link establishment will determine, according to the above description using the service LINK_ALIVE, whether the respective connection partner supports protocol execution in accordance with the second protocol stack. If this is the case, the LINK_CHANGE_DETECTED service will be transmitted, for example, over both the newly established link and the second link that had already been established. Initiating of both LINK_CHANGE_DETECTED services will appropriately be performed by the processor unit of that xDSL data transmission device of the two xDSL data transmission devices involved in the link establishment which has the larger unique number that was previously exchanged using the LINK_ALIVE service. In configurations according to FIGS. 1 and 6 to 8, it is not possible to have more than two links involved in a single xDSL data transmission device. The LINK_CHANGE_DETECTED service is then forwarded appropriately unchanged by all involved xDSL data transmission devices within the configuration, as long as this is possible. When the service cannot be forwarded by an xDSL data transmission device anymore, because there is no second link provided, this data transmission device will start, for example, the INC_DEVICES service on the link through which the LINK_CHANGE_DETECTED service was received before. That means, the xDSL data transmission devices at both ends of a line will sooner or later start the INC_DEVICES service in opposite directions.

The INC_DEVICES service preferably includes the unique device number of the initiating device and an additional parameter which is incremented upon receipt of the service. Upon initiation of the INC_DEVICES service, the parameter is set to the value of 1, for example, and is then forwarded by the xDSL data transmission devices with a respective incremented value until the service has arrived at the other end of the line. All xDSL data transmission devices of the xDSL data transmission system memorize the parameter before incrementing it and thus know how many xDSL transmission devices will yet follow behind each of the two connected xDSL interfaces. In this way, basically, the total number of xDSL data transmission devices connected to the xDSL data transmission system is already known.

When an xDSL data transmission device which is located at the end of the line receives the INC_DEVICES service, this xDSL data transmission device will consequently know the total number of xDSL data transmission devices in the line.

Suitably, this xDSL data transmission device, or the processor unit therein, will initiate, based on the processing according to the second protocol stack, the SET_DEVICES service, for example, which is forwarded back to the other end of the line of xDSL data transmission devices. This service includes, for example, in addition to the unique device number, the total number of xDSL data transmission devices found in the system, inter alia, to communicate it to every xDSL transmission device in the xDSL data transmission system.

When an xDSL data transmission device in the xDSL data transmission system received the INC_DEVICES and SET_DEVICES services as described above at each of its two interfaces, the stored values are preferably checked for validity, and only when the values are consistent, they are accepted and saved. Each xDSL data transmission device of the line therefore knows how many xDSL data transmission devices follow behind each of the two interfaces. The physical configuration has thus been detected.

Subsequently, preferably all xDSL data transmission devices initiate the ADVERTISE_LINK_DIAGNOSTICS service, one by one. This service is then transmitted from each of the xDSL data transmission devices to all interfaces that are connected to the xDSL data transmission system, and is forwarded by each device until the end of the line. For this purpose, the ADVERTISE_LINK_DIAGNOSTICS service preferably includes, in addition to the unique device number of the initiator, the number of xDSL data transmission devices that follow to the initiating xDSL data transmission device per interface, and a respective number denoting the interface connected to the xDSL data transmission system. In addition, this service advantageously also includes a parameter that is incremented upon each forwarding. Using this information, each xDSL data transmission device may determine the xDSL data transmission device of the xDSL data transmission system to which these management data intended for diagnostics that are also included in this service refer. Such management data for example relate to the data throughput of the interfaces of the initiating xDSL data transmission device, to error counters, but also to analog values, such as e.g. a signal-to-noise ratio, or a light output.

When all xDSL data transmission devices have provided their management data intended for diagnostics, the ADVERTISE_LINK_DIAGNOSTICS service continues to run, preferably cyclically, or optionally depending on events of the xDSL data transmission devices of the xDSL data transmission system.

The physical configuration has thus been detected, and basic data concerning the diagnostics of the whole system are known to each xDSL data transmission device of the xDSL data transmission system.

If, in a modification to the linear configuration described above, a link has been established at the end of a linear configuration and thus extends the previously existing line by one xDSL data transmission device, establishment may be performed in a similar way. If, however, the xDSL data transmission device newly connected at the end of the linear configuration has the greater unique number, this device will preferably first initiate the LINK_CHANGE_DETECTED service, and immediately afterwards the INC_DEVICES service, since it represents the end of the linear configuration.

If, in a further modification to the linear configuration described above, a new link is intended to connect both ends of a linear configuration to a ring configuration, the establishment may initially take place according to the above example. After a certain time, however, the LINK_CHANGE_DETECTED services which the initiating xDSL data transmission device, i.e. the device adding the respective management data, has sent to the two interfaces, will inevitably return to the initiating xDSL data transmission device. The device will recognize from the unique number of the service initiator, which is a parameter of the service, that it is itself that has started the service, so that a ring configuration must exist. In response thereto, the initiating xDSL data transmission device initiates the RING_DETECTED service on both interfaces, for example. This service is forwarded unchanged by all other xDSL data transmission devices of the xDSL data transmission system to inform all these devices of the system that a ring is existing. This service preferably also includes the unique number of the initiator, so that the initiating xDSL data transmission device will recognize to not once again forwarding the service when it receives the service at the respective other interface.

When the xDSL data transmission device that detected the ring as described above has received the RING_DETECTED service again on each of the two interfaces, it starts the INC_DEVICES service at each of the two interfaces, like in a linear configuration. That means, the xDSL data transmission device which detected the ring will first behave like an endpoint device of a line at each interface connected to the system. After receipt of the INC_DEVICES services it also initiates the SET_DEVICES service at each of the two interfaces. Thus, all xDSL data transmission devices of the xDSL data transmission system will be aware that a ring is existing, how many xDSL data transmission devices are provided in the ring, and how far it is to the xDSL data transmission device that has detected the ring.

Then, however, preferably the xDSL data transmission device that has detected the ring, first blocks the newly established link for payload data transfer at the own device, for example by setting the corresponding port of an Ethernet switch into the "blocked" state, as described above, and transmits a service "block link" (BLOCK_LINK) via the link that had just been blocked for payload data, for example. The BLOCK_LINK service preferably includes a parameter for addressing the other xDSL data transmission device intended for reading out these management data, which is decremented upon each forwarding of the service. When this parameter has reached the value of 0, this xDSL data transmission device is addressed and then blocks that link through which the addressed xDSL data transmission device received the service for payload data transfer. So, here, this parameter is set to 1 by the initiating xDSL data transmission device to address the neighboring device and to cause it to also block the link for transfer of payload data.

As with a linear configuration, all xDSL data transmission devices will appropriately initiate, one by one, the ADVERTISE_LINK_DIAGNOSTICS service to provide their link diagnostics to all xDSL data transmission devices in the xDSL data transmission system. In this case, the xDSL data transmission device that has initiated the previous services for identifying the system configuration advantageously likewise behaves like an endpoint device of a linear configuration.

When enough diagnostics information are available, the xDSL data transmission device which detected the ring, preferably performs a cyclic evaluation of all xDSL transmission links of the system. If it finds a considerably worse xDSL transmission link in the ring than the one that was blocked for payload data transfer, it preferably initiates the BLOCK_LINK service to each of the two xDSL data transmission devices connected to the critical xDSL transmission link via the corresponding link. Immediately afterwards, the ACTIVATE_LINK service is transmitted to the neighboring device in order to re-enable the link previously blocked for payload data transfer. ACTIVATE_LINK, like BLOCK_LINK, preferably includes a parameter which is decremented upon forwarding across the devices, and which thus correctly addresses a device when it has reached the value of 0.

Switching to an alternative xDSL transmission link is for example possible because of an increased data throughput, a better signal-to-noise ratio, or greater receive power, a larger amplitude of the receive signal, etc., if the xDSL data transmission devices of the xDSL data transmission system provide these diagnostic values.

When a link in an xDSL transmission line fails, preferably both xDSL data transmission devices which detect the link termination, e.g. due to a missing acknowledgment of a cyclic LINK_ALIVE service, or from a value read from a phy pertaining to an Ethernet network, will send a LINK_CHANGE_DETECTED on the still remaining link. As in case of link establishment, this service will be forwarded across all xDSL data transmission devices of the system. If an xDSL data transmission device whose interface is disabled for payload data transfer receives this service from any interface, its processor unit will immediately re-enable the blocked interface for payload data transfer via the Ethernet switch connected thereto.

The rest of system configuration detection is accomplished in similar manner to that of the above examples of a linear configuration, however the INC_DEVICES and SET_DEVICES services will arrive twice per interface.

Furthermore, if a line has been established, for example as in the aforementioned embodiments of a linear configuration, and if a link within that line fails, the xDSL data transmission system decomposes into two lines. The newly occurring configuration is preferably detected as follows:

Both xDSL data transmission devices involved in the failed link will for example transmit the LINK_CHANGE_DETECTED service on the respective second link that is still connected to a neighboring xDSL data transmission device. In response thereto, each of these two xDSL data transmission devices will start the INC_DEVICES service. When the LINK_CHANGE_DETECTED service arrives at the other end of a line, the INC_DEVICES service will also be initiated there. Further processing is then again according to the above-described examples of a linear configuration.

Furthermore, most preferably, another advantageous application of the invention is effectively provided for by a service referred to as "tunnel message" (TNL_MSG), for example, and associated with the management data, which may provide a tunnel through which even data of a superimposed protocol such as classical AT commands may be forwarded to any remote xDSL data transmission device using an address.

The address consists of an identification of the link, on which the superimposed protocol data are to be forwarded, and an indication of the number of xDSL data transmission devices the protocol data are to pass through in the direction of this link. The maximum number of addressable devices per link is determined as in the examples mentioned above. When the protocol data are forwarded across a device, the address parameter is decremented. When the address parameter reaches the value of 0, then that xDSL data transmission device that has received the service, has been correctly addressed as the xDSL data transmission device intended for reading out.

In addition to the address, the TNL_MSG service preferably further includes a parameter that is incremented upon forwarding. In this way, the addressed device will also receive an information about where to return any acknowledgments of the superimposed protocol.

Thus, it is possible for an active xDSL data transmission device to present on a web page the entire physical configuration of the xDSL data transmission system including the passive xDSL data transmission devices. By using the TNL_MSG service, the active xDSL data transmission device may then also present a diagnostics of any xDSL data transmission device, even of passive ones, and may even configure these xDSL data transmission devices. In case a passive xDSL data communication device has a serial interface, for example, it is even possible to diagnose or configure other xDSL data transmission devices of the xDSL data transmission system from a passive xDSL data transmission device locally connected to the computer, that means a configuration of an active xDSL data transmission device would even be possible from a passive xDSL data transmission device, for example.

Furthermore, an additional service "advertise alarm" (ADVERTISE_ALRM) may for example be provided to notify critical states of an xDSL data transmission device to all xDSL data transmission devices in the xDSL data transmission system, or to notify the disappearance of a critical state thus eliminating the need to poll the xDSL data transmission devices via tunneling services to determine a critical state.

Based on the above description it will be apparent that by using the xDSL data transmission devices according to the present invention and based on the execution and depending on the configuration of the second protocol stack, it is also possible for such diagnostics to be only supported at the endpoint devices of a line, for example, or when relating to extensive diagnostics, the number of other participants of an Ethernet network connected to a respective connection port of an xDSL data transmission device may be made available throughout the xDSL transmission system.

Figure 9:
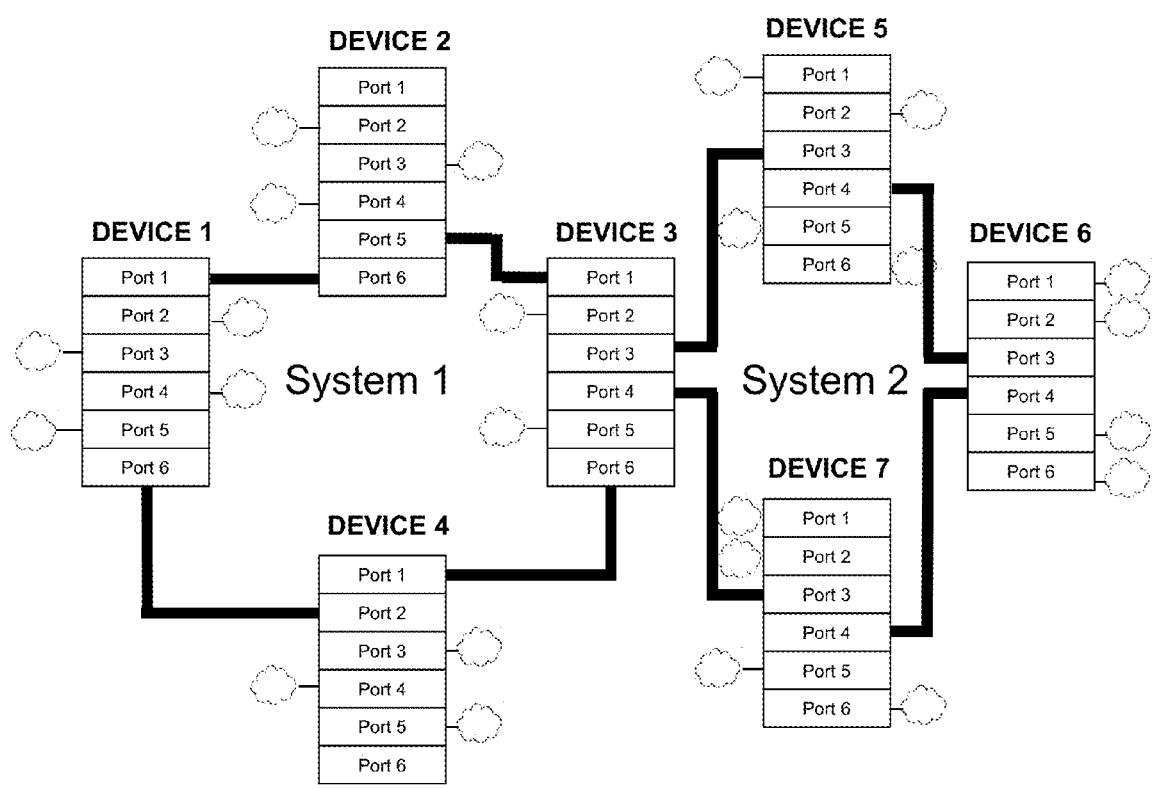
FIG. 9 shows an exemplary combination of two ring configurations of an xDSL data transmission system according to the invention.

If for example a configuration is similar to that of FIG. 9, i.e. that a plurality of xDSL data transmission systems are connected through one xDSL data transmission device, xDSL data transmission devices according to the invention or xDSL data transmission systems according to the invention having a plurality of such xDSL transmission devices even allow to access other xDSL data transmission systems from one xDSL data transmission system, based on the execution and depending on the configuration of the second protocol stack. Therefore, even complex systems with many branches may be diagnosed centrally.

For this purpose it is suggested that the xDSL data transmission devices first indicate if there are further branches originating therefrom. This is for example provided for by the "get subsystems" (GET_SUBSYSTEMS) service. One possible configuration of such a service that can be assigned to the management data and that starts such a request is illustrated in FIG. 4.

Accordingly, the requesting service GET_SUBSYSTEMS for example includes a parameter specifying the number N of subsystems into which is to be branched, the number X of subsystems already branched into, and for each subsystem a destination address and a source address. In addition, the service includes an indication, for each subsystem, about the port from which the service was forwarded from an xDSL data transmission device into the corresponding subsystem (source port), and to which port the service is to be forwarded (destination port).

A possible configuration of such a service assignable to the management data, which provides a relevant answer (response) is illustrated in FIG. 5.

Accordingly, the response of the service returns how many subsystems follow when looking from the addressed xDSL data transmission device, how many xDSL data transmission devices follow behind each port of each subsystem, and if there is possibly a ring existing in the corresponding subsystem. In order that the response can be returned to the initiator of the request, an indication is required of the number of subsystems into which the response is to be branched, and an indication about into how many subsystems the response has already been branched. Furthermore, for each subsystem an xDSL data transmission device destination address is specified, and a number of the port through which the addressed xDSL data transmission device will forward the response to the next subsystem.

If an entire branched configuration is to be detected, each detected xDSL data transmission device has to be polled, one by one, i.e. this service has to be initiated actively. In order to provide for access of remote xDSL data transmission devices, the TNL_MSG service is appropriately extended by the addressing capacities of the GET_SUBSYSTEMS service.

If, for example based on a configuration according to FIG. 9, the xDSL data transmission device designated by 1 wants to transmit the service to the xDSL data transmission device designated by 3, in order to detect any additional systems originating from device 3, the number of subsystems into which to be branched would be zero, since both xDSL data transmission devices are located within one system. Device 1 initiates the service, so the number of subsystems already branched into is also zero. Specifying a source port number from where a forwarding subsystem has been addressed is irrelevant in this example and is set to 0. The destination port, via which the service is to be forwarded is also irrelevant in this example, and is also set to 0.

So device 1 would transmit the GET_SUBSYSTEMS service, e.g. via port 1, the number of subsystems into which to be branched would be 0, the number of systems already branched into is also 0, the source address would initially be 0 (it is incremented upon forwarding), and the destination address would be 2. Device 2 would receive the service on port 6 and first evaluate the number of subsystems already branched into. This number is 0, i.e. the first source and destination addresses of the service are to be evaluated by the device. Device 2 increments the source address to 1, and decrements the destination address to 1. Since the destination address has not yet reached 0, device 2 detects that it is not itself that has been addressed, and forwards the so modified service via port 5. Device 3 receives the service on port 1. The number of subsystems already branched into is zero. That means, device 3 also evaluates the first source and destination addresses. It increments the source address to 2, and decrements the destination address to zero. The device now feels addressed and evaluates the number of subsystems into which to be branched. This number is also 0, i.e. device 3 does not forward the service to another subsystem but answers itself:

The number of subsystems to which the response is to be forwarded is the same as the number of subsystems in which the request had been forwarded, i.e. zero. The number of subsystems to which the response has already been transmitted is of course also zero. Since the response is addressed to a device in the own system, specifying a port number of the next system is irrelevant and would also be zero. The destination address of the device is taken from the incremented source address, so it is 2.

The number of other systems originating from device 3 is 1. The first port number of the following subsystem is 3, the second port number of the following subsystem is 4, the number of devices connected via port 3 is the same as the number of devices connected via port 4 and is 3. Since this subsystem is configured as a ring, a corresponding flag is set in a further parameter. Then the response is transmitted on the link on which the request was received.

If, for example based on a configuration according to FIG. 9, the xDSL data transmission device designated by 1 wants to transmit the GET_SUBSYSTEMS service via device 3 to the xDSL data transmission device designated by 5, in order to detect any additional systems originating from device 5, the number of subsystems into which to be branched is 1.

Device 1 initiates the service, so the number of subsystems already branched into is 0. Specifying the first source port number from where a forwarding subsystem has been addressed is initially irrelevant and is set to 0. The first destination port, via which the service is to be forwarded would be port 3 here, i.e. device 3 is to forward the service via port 3 to device 5. The first destination address would be that of device 3, that is 2. The second source port number is also irrelevant and is set to 0. The second destination port is also irrelevant and is set to 0. The second destination address is 1. It specifies the number of devices when the service is forwarded via the first destination port of device 3, i.e. port 3 in this case. So device 1 would transmit the GET_SUB-SYSTEMS service via port 1. Device 2 would receive the service and first evaluate the number of subsystems already branched into. This number is 0, i.e. the first source and destination addresses of the service are to be evaluated by the device. Device 2 increments the first source address to 1, and decrements the first destination address to 1. Since the destination address has not yet reached 0, device 2 detects that it is not itself that has been addressed, and forwards the so modified service via port 5. Device 3 receives the service on port 1. The number of subsystems already branched into is zero. That means, device 3 also evaluates the first source and destination addresses. It increments the source address to 2, and decrements the destination address to 0. The device now feels addressed and evaluates the number of subsystems into which to be branched. This number is 1, while the number of subsystems already branched into is 0. So device 3 increments the number of subsystems to 1. As a second source port, i.e. the port via which the subsystem has been addressed, device 3 sets port 1, because it has received the service from this port. Now device 3 forwards the service via the port that is defined by the first destination address, i.e. port 3 in this case. Device 5 will then receive the service on port 3. It now evaluates the second destination address and source address, i.e. the source address is incremented and the destination address is decremented. Upon decrementing, device 5 obtains the value of 0 as the second destination address and is therefore addressed. Device 5 determines that the number of subsystems into which to be branched is the same as the number of subsystems already branched into. That means, device 5 now initiates the response.

Based on the request and based on its own system information, device 5 can identify the following parameters for the response:
Subsystems into which to be branched (response)=subsystems into which to be branched (request).
Subsystems, already branched into: 0 (initiation of the response).
First destination port from which the next subsystem originates (response)=last registered source port of the request. In the example, the latter was set by device 3 prior to forwarding to the next subsystem (port 1).
Destination address of the first subsystem (response)= source address of the last subsystem (request)=1.
Second destination port from which the next subsystem originates (response)=penultimate registered source port of the request. The second destination port of the example is irrelevant, as is the penultimate source port of the example, since no further forwarding into other systems is done.
Destination address of the second subsystem (response)= source address of the penultimate subsystem (request)= 2.
Number of additional subsystems: This number is 0, since no other subsystems originate from device 5. Therefore, all other parameters of the response are unnecessary.

With these parameters, the response with the data will find its way back to the sender of the request in a similar way.

In summary, therefore, the invention provides a data transmission method for transmitting data within an xDSL data transmission system which comprises at least two xDSL data transmission devices connecting at least two Ethernet networks to the xDSL data transmission system, wherein the method uses a respective xDSL data transmission frame according to a first protocol stack for transmitting payload data via a transmission link provided between two adjacent xDSL data transmission devices, in which additionally an embedded operations channel is provided according to the first protocol stack, and wherein a second protocol stack different from the first protocol stack is provided, according to which an access to the embedded operations channel within an xDSL data transmission device is executed independently of any access to the payload data; and wherein management data for diagnostics and configuration of the xDSL data transmission system are added to the embedded operations channel independently of the payload data of the xDSL data transmission frame, and are transferred therein, and read out therefrom.

Based on the execution according to the second protocol stack and in response to management data read from the embedded operations channel for operating a redundant ring configuration, an access of an xDSL data transmission device to an xDSL transmission link connected with this xDSL data transmission device is preferably blocked with respect to payload data of the xDSL data transmission frame, while the access to this xDSL transmission link with respect to management data of the embedded operations channel is maintained.

Furthermore, based on the execution according to the second protocol stack, the management data have associated therewith predefined services for detecting the physical configuration of the xDSL data transmission system, and identifiers are added for identifying the location within the physical configuration of the xDSL data transmission system of the xDSL data transmission device that adds the respective management data, wherein furthermore, preferably, based on the execution according to the second protocol stack, the management data have associated therewith further predefined services, using the detected physical configuration of the xDSL data transmission system, and identifiers are added for identifying the location within the physical configuration of the xDSL data transmission system of an xDSL data transmission device intended for reading out the respective management data.

In a particularly preferred embodiment, accordingly, in addition to the identifiers for identifying the location within the physical configuration of the xDSL data transmission system of an xDSL data transmission device intended for reading out the respective management data, identifiers are added for identifying the location within the physical configuration of the xDSL data transmission system of the xDSL data transmission device that adds the respective management data.

Moreover, according to a complementary or alternative modification, further based on the execution according to the second protocol stack, identifiers are added to the management data for identifying the location within the physical configuration of the xDSL data transmission system of the xDSL data transmission device which adds the respective management data, which identifiers are incremented by an xDSL data transmission device when forwarding the respective management data, and/or identifiers are added for identifying the location within the physical configuration of the xDSL data transmission system of an xDSL data transmission device intended to read out the respective management data, which identifiers are decremented by an xDSL data transmission device when forwarding the respective management data.

In particular in case of an SHDSL transmission system, xDSL data transmission devices according to the invention which support the protocol according to the second protocol stack different from the first protocol stack, will therefore not pass the management data via an Ethernet switch connected to an SHDSL chip, as usually done in active network devices according to the prior art, but via a processor interface of the SHDSL chip, which causes that the processor unit does not need any interface to the Ethernet switch, e.g. a MAC, for this purpose.

Payload data is thus transferred via an interface leading to the Ethernet switch, e.g. RMII. Management data, by contrast, are exchanged via the processor interface, so that absolutely no management data but only payload data will reach the Ethernet switch. If a port of the Ethernet switch is blocked for all data, the management data will continue to be transferred via the processor interface.

The processor units according to the invention therefore do no longer require any Ethernet interfaces.

What is claimed is:

1. A data transmission method for transmitting data within an xDSL data transmission system which comprises at least two xDSL data transmission devices connecting at least two Ethernet networks to the xDSL data transmission system, comprising:
   using a respective xDSL data transmission frame according to a first protocol stack for transmitting payload data via a transmission link provided between two adjacent xDSL data transmission devices, in which additionally an embedded operations channel is provided according to the first protocol stack;
   providing a second protocol stack different from the first protocol stack according to which an access to the embedded operations channel within an xDSL data transmission device is executed independently of any access to the payload data; and
   subsequently adding management data for diagnostics and configuration of the xDSL data transmission system to the embedded operations channel independently of the payload data of the xDSL data transmission frame, transferring them therein, and reading them out therefrom;
   wherein, due to the respective independent execution of access to the embedded operation channel, directly addressing a plurality of other xDSL transmission devices from each of such xDSL data transmission devices, and a restriction of the number of participants of such a system as specified by a relevant standard will be eliminated.

2. The data transmission method as claimed in claim 1, comprising, based on the execution according to the second protocol stack and in response to management data read from the embedded operations channel for operating a redundant ring configuration,
   blocking access of an xDSL data transmission device to an xDSL transmission link connected with this xDSL data transmission device with respect to payload data of the xDSL data transmission frame, while maintaining access to said xDSL transmission link with respect to management data of the embedded operations channel.

3. The data transmission method as claimed in claim 1, comprising, based on the execution according to the second protocol stack,
   assigning predefined services for detecting the physical configuration of the xDSL data transmission system to the management data, and
   adding identifiers for identifying the location within the physical configuration of the xDSL data transmission system of the xDSL data transmission device that adds the respective management data.

4. The data transmission method as claimed in claim 3, comprising, based on the execution according to the second protocol stack,
   assigning predefined services to the management data using the detected physical configuration of the xDSL data transmission system, and
   adding identifiers for identifying the location within the physical configuration of the xDSL data transmission system of an xDSL data transmission device intended for reading out the respective management data.

5. The data transmission method as claimed in claim 4, comprising, in addition to the identifiers for identifying the location within the physical configuration of the xDSL data transmission system of an xDSL data transmission device intended for reading out the respective management data,
   adding identifiers for identifying the location within the physical configuration of the xDSL data transmission system of the xDSL data transmission device that adds the respective management data.

6. The data transmission method as claimed in claim 1, comprising, based on the execution according to the second protocol stack,
   adding, to the respective management data, identifiers for identifying the location within the physical configuration of the xDSL data transmission system of the xDSL data transmission device which adds the respective management data, which identifiers are incremented by an xDSL data transmission device when forwarding the respective management data, and/or
   adding identifiers for identifying the location within the physical configuration of the xDSL data transmission system of an xDSL data transmission device intended for reading out the respective management data, which identifiers are decremented by an xDSL data transmission device when forwarding the respective management data.

7. A data transmission method for transmitting data within an xDSL data transmission system which comprises at least two xDSL data transmission devices connecting at least two Ethernet networks to the xDSL data transmission system, comprising:
   using a respective xDSL data transmission frame according to a first protocol stack for transmitting payload data via a transmission link provided between two adjacent xDSL data transmission devices, in which additionally an embedded operations channel is provided according to the first protocol stack;
   providing a second protocol stack different from the first protocol stack according to which an access to the embedded operations channel within an xDSL data transmission device is executed independently of any access to the payload data; and
   subsequently adding management data for diagnostics and configuration of the xDSL data transmission system to the embedded operations channel independently of the payload data of the xDSL data transmission frame, transferring them therein, and reading them out therefrom;

wherein, based on the execution according to the second protocol stack and in response to management data read from the embedded operations channel for operating a redundant ring configuration, blocking access of an xDSL data transmission device to an xDSL transmission link connected with this xDSL data transmission device with respect to payload data of the xDSL data transmission frame, while maintaining access to said xDSL transmission link with respect to management data of the embedded operations channel.

8. The data transmission method as claimed in claim 7, comprising, based on the execution according to the second protocol stack, assigning predefined services for detecting the physical configuration of the xDSL data transmission system to the management data, and adding identifiers for identifying the location within the physical configuration of the xDSL data transmission system of the xDSL data transmission device that adds the respective management data.

9. The data transmission method as claimed in claim 8, comprising, in addition to the identifiers for identifying the location within the physical configuration of the xDSL data transmission system of an xDSL data transmission device intended for reading out the respective management data, adding identifiers for identifying the location within the physical configuration of the xDSL data transmission system of the xDSL data transmission device that adds the respective management data.

10. The data transmission method as claimed in claim 7, comprising, based on the execution according to the second protocol stack, assigning predefined services to the management data using the detected physical configuration of the xDSL data transmission system, and adding identifiers for identifying the location within the physical configuration of the xDSL data transmission system of an xDSL data transmission device intended for reading out the respective management data.

11. The data transmission method as claimed in claim 7, comprising, based on the execution according to the second protocol stack, adding, to the respective management data, identifiers for identifying the location within the physical configuration of the xDSL data transmission system of the xDSL data transmission device which adds the respective management data, which identifiers are incremented by an xDSL data transmission device when forwarding the respective management data, and/or adding identifiers for identifying the location within the physical configuration of the xDSL data transmission system of an xDSL data transmission device intended for reading out the respective management data, which identifiers are decremented by an xDSL data transmission device when forwarding the respective management data.

* * * * *